United States Patent
Kotani (10) Patent No.: US 7,764,390 B2
(45) Date of Patent: Jul. 27, 2010

(54) IMAGE FORMING DEVICE

(75) Inventor: Masaki Kotani, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1030 days.

(21) Appl. No.: 11/461,714

(22) Filed: Aug. 1, 2006

(65) Prior Publication Data

US 2007/0041055 A1    Feb. 22, 2007

(30) Foreign Application Priority Data

Aug. 22, 2005  (JP)  ............................ 2005-239619

(51) Int. Cl.
G06F 3/12    (2006.01)
G06F 15/00   (2006.01)
G06F 7/04    (2006.01)
G06F 7/00    (2006.01)
G06K 1/00    (2006.01)

(52) U.S. Cl. .................... 358/1.13; 358/1.1; 358/1.15; 358/1.18; 726/7; 707/999.1

(58) Field of Classification Search ................ 358/1.15, 358/1.1, 1.13, 1.18; 726/7; 707/100, 999.1
See application file for complete search history.

(56) References Cited

U.S. PATENT DOCUMENTS

| | | | |
|---|---|---|---|
| 6,075,519 | A | 6/2000 | Okatani et al. |
| 6,567,627 | B2 | 5/2003 | Maeda et al. |
| 6,744,424 | B2 | 6/2004 | Maeda et al. |
| 6,785,487 | B2 | 8/2004 | Maeda et al. |
| 2002/0015598 | A1 | 2/2002 | Maeda et al. |

(Continued)

FOREIGN PATENT DOCUMENTS

CN    1225464 A    8/1999

(Continued)

OTHER PUBLICATIONS

Japanese language office action and its English language translation for corresponding Japanese application 2005239619 lists the references above.

(Continued)

*Primary Examiner*—Thierry L Pham
*Assistant Examiner*—Satwant K Singh
(74) *Attorney, Agent, or Firm*—Hogan Lovells US LLP (57) ABSTRACT

An image forming device includes four operation modes: a copy mode, a fax mode, an e-mail mode and a scanner mode. The image forming device can set a processing content of each operation mode for each prescribed setting item. The image forming device includes a favorite keys group to which setting items selected from all setting items of all operation modes can be assigned. Setting items selected from all setting items of a particular operational mode can be assigned to a standby screen keys group included in a standby screen for that operational mode. A setting item not assigned to the standby screen keys group for a particular operational mode is assigned to a menu screen keys group for that operational mode. When detecting an operation performed on a key included in the favorite keys group, the standby screen keys group and the menu screen keys group, the image forming device performs a setting operation for the setting item assigned to the operated key.

20 Claims, 7 Drawing Sheets

U.S. PATENT DOCUMENTS

| | | |
|---|---|---|
| 2002/0047815 A1 | 4/2002 | Maeda et al. |
| 2002/0136563 A1 | 9/2002 | Maeda et al. |
| 2005/0289645 A1* | 12/2005 | Hori .............................. 726/7 |
| 2006/0031238 A1* | 2/2006 | Baba .......................... 707/100 |
| 2006/0080184 A1* | 4/2006 | Zhang et al. .................. 705/26 |

FOREIGN PATENT DOCUMENTS

| | | |
|---|---|---|
| JP | 04339454 A | 11/1992 |
| JP | 07-236016 | 9/1995 |
| JP | 11133813 A | 5/1999 |
| JP | 2000-165574 | 6/2000 |
| JP | 2000165574 A | 6/2000 |
| JP | 2002-064661 | 2/2002 |
| JP | 2002132100 A | 5/2002 |
| JP | 2002354170 A | 12/2002 |
| JP | 2004-234195 | 8/2004 |
| JP | 2004282276 A | 10/2004 |
| JP | 2005007579 A | 1/2005 |

OTHER PUBLICATIONS

European Search Report for corresponding European application No. 06016638.6 lists the references above.

Chineses language office action and its English language office action for corresponding Chinese application 2006101213477 lists the references above.

* cited by examiner

IMAGE FORMING DEVICE

BACKGROUND OF THE INVENTION

1. Field of the Invention

The present invention relates to an image forming device which includes a plurality of operation modes and which can set a processing content of each of the operation modes for each prescribed setting item.

2. Description of the Related Art

A conventional Multi Function Peripheral (MFP) including a plurality of operation modes can set a processing content of each of the operation modes for each prescribed setting item.

For example, a conventional MFP includes operation modes such as a copy mode, a fax mode, an electronic mail (e-mail) mode and a scanner mode. Such a conventional MFP can set the processing content for each setting item. For example, the setting item is an image quality, a density and paper or the like in the copy mode; an image quality, a density and a redial or the like in the fax mode; an image quality, a density and an e-mail address or the like in the e-mail mode; and an image quality, a density and a resolution or the like in the scanner mode.

In the conventional MFP, the setting items are assigned to a software keys group displayed on a display unit in response to an operation of a menu key, and a software keys group displayed on the display unit during a standby state of each of the operation modes. When the MFP detects that an operation has been performed on a software key assigned with a setting item, the display unit displays a setting screen for performing a setting operation on such a setting item. Accordingly, a setting can be made with respect to such a setting item.

According to another conventional art, an MFP is capable of assigning a setting item to a hardware keys group, which may be operated regardless of the operation mode taking convenience of an operator into consideration. Such a hardware keys group is known as "Favorite Key" or "ANYKEY".

According to a still another conventional art, an MFP can assign a key with a function for switching modes between a copy mode and a fax mode.

However, the conventional MFPs are required to select the setting item to be assigned to the hardware keys group from limited choices.

In addition, the setting items assigned to the software keys group displayed on the display unit in response to the operation of the menu key and the software keys group displayed on the display unit during the standby state of each of the operation modes are fixed and cannot be changed.

Thus, in the conventional MFP, there is inconvenience when performing the setting operation of each setting item.

SUMMARY OF THE INVENTION

The present invention overcomes the problems described above and improves operability of an image forming device such as an MFP.

One embodiment of the present invention relates to an image forming device which includes a plurality of operation modes and which is capable of setting a processing content of each of the operation modes for each prescribed setting item. The image forming device includes a first operational objects group, a second operational objects group, a third operational objects group, and a control unit. The first operational objects group can be assigned with setting items. The second operational objects group can also be assigned with setting items. The third operational objects group can be assigned with setting items that are not assigned to the second operational objects group. When the control unit detects that an operation has been performed on each operational object of the first operational objects group, the second operational objects group and the third operational objects group, the control unit enables a setting to be made for a setting item assigned to such an operational object.

According to another aspect of the present invention, any setting item of any operation mode may be assigned to each of the operational objects of the first operational objects group.

According to another aspect of the present invention, only one setting item may be assigned to each of the operational objects of the first operational objects group.

According to another aspect of the present invention, the first operational objects group is a hardware keys group.

According to another aspect of the present invention, the image forming device also includes a display unit arranged to display a software keys group, and the second operational objects group is the software keys group displayed on the display unit under a standby state of each of the operation modes.

According to another aspect of the present invention, the image forming device also includes a display unit arranged to display a software keys group, and the third operational objects group is the software keys group displayed on the display unit in response to a prescribed operation.

According to another aspect of the present invention, a setting item may be flexibly assigned to each of the operational objects of the first operational objects group, the second operational objects group and the third operational objects group. As a result, operability of the image forming device improves.

According to another aspect of the present invention, a limit is not imposed on the operation mode of the setting item assigned to each of the operational objects of the first operational objects group. As a result, even when a number of operational objects included in the first operational objects group is small, a necessary setting item may be assigned.

According to another aspect of the present invention, a plurality of setting items are not assigned to one operational object of the first operational objects group. As a result, an erroneous operation may be prevented.

According to another aspect of the present invention, an operation may be performed on the first operational objects group regardless of the operation mode. As a result, a setting operation can be performed easily for the setting item assigned to the first operational objects group.

According to another aspect of the present invention, since the second operational objects group is the software keys group, a number of operational objects of the second operational objects group may be increased and decreased.

Other features, elements, processes, steps, characteristics and advantages of the present invention will become more apparent from the following detailed description of preferred embodiments of the present invention with reference to the attached drawings.

Figure 1:
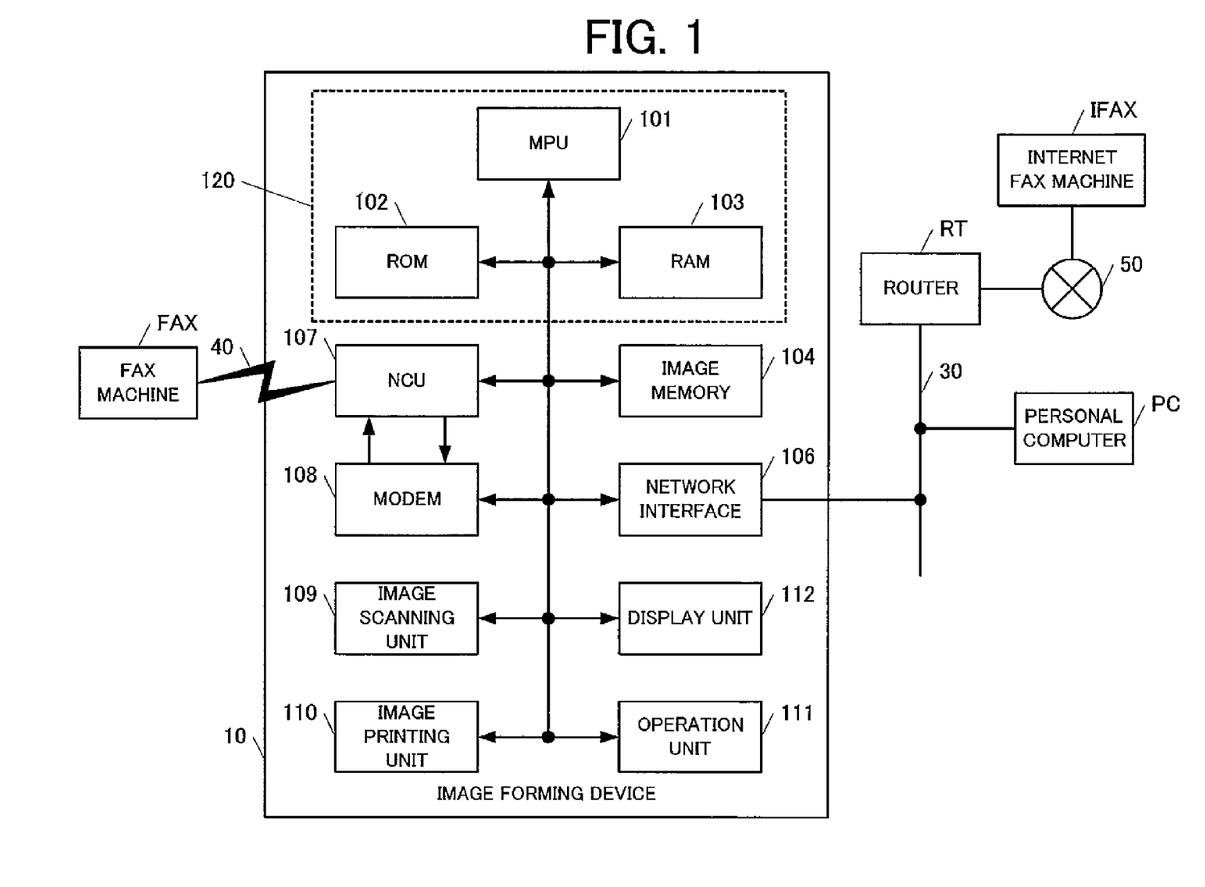
FIG. 1 is a block diagram illustrating a configuration of an image forming device and a peripheral configuration according to a preferred embodiment of the present invention.

DETAILED DESCRIPTION OF PREFERRED EMBODIMENTS (1. Overall configuration of an image forming device) FIG. 1 is a block diagram illustrating a configuration of an image forming device 10 and a peripheral configuration according to a preferred embodiment of the present invention. The image forming device 10 is a digital MFP including four operation modes: a copy mode, a fax mode, an e-mail mode and a scanner mode.

As illustrated in FIG. 1, the image forming device 10 includes a Micro Processor Unit (MPU) 101, a Read Only Memory (ROM) 102, and a Random Access Memory (RAM) 103. The MPU 101, the ROM 102 and the RAM 103 constitute a microcomputer 120. The microcomputer 120 executes a program stored in the ROM 102 and controls each component of the image forming device 10 to execute various functions of the image forming device 10.

An image memory 104 of the image forming device 10 stores image data of an image to be processed by the image forming device 10.

The image forming device 10 includes an image scanning unit 109 and an image printing unit 110. The image scanning unit 109 scans an image on an original document by a Charge-Coupled Device (CCD) image sensor or the like. The image scanning unit 109 scans the image on the original document by an Automatic Document Feeder (ADF) method or a Flat Bed Scanner (FBS) method. The image printing unit 110 forms an image on a printing medium by an electrophotographic method.

The image forming device 10 includes an operation unit 111 and a display unit 112 as a user interface.

A network interface 106 connects the image forming device 10 to a network 30 by the Ethernet (registered trademark), for example. The network 30 is connected to the Internet 50 via a network apparatus such as a router RT. Accordingly, the image forming device 10 can communicate with a personal computer PC connected to the network 30 and with an Internet fax machine IFAX connected to the Internet 50.

A Network Control Unit (NCU) 107 and a Modulator Demodulator (MODEM) 108 are used for transmitting and receiving image data via a Public Switched Telephone Network (PSTN) 40. The NCU 107 controls a connection to the PSTN 40. The NCU 107 includes a function for transmitting a dial signal corresponding to a telephone number of a communication destination and a function for detecting an incoming call. The MODEM 108 modulates transmission data and demodulates received data in accordance with V.17, V.27ter, V.29 or the like based on a facsimile transmission control protocol of the International Telecommunciation Union-Telecommunications (ITU-T) recommendation T.30. The MODEM 108 also modulates transmission data and demodulates received data in accordance with V.34.

Under the copy mode, the image forming device 10 provides an image scanned by the image scanning unit 109 to the image printing unit 110. Accordingly, the image is printed onto a printing medium.

Under the fax mode, the image forming device 10 transmits an image scanned by the image scanning unit 109 to a fax machine FAX via the PSTN 40 under a G3 scheme or a super G3 scheme. The image forming device 10 also receives an image transmitted from the fax machine FAX via the PSTN 40, and provides the received image to the image printing unit 110. Accordingly, the image is printed onto a printing medium.

Under the e-mail mode, the image forming device 10 attaches an image scanned by the image scanning unit 109 to e-mail, and transmits the e-mail to the Internet fax machine IFAX via the network 30, the router RT and the Internet 50. Under the e-mail mode, the image forming device 10 downloads e-mail from a Post Office Protocol (POP) server, and provides the image attached to the e-mail to the image printing unit 110. Accordingly, the image is printed onto a printing medium.

Under the scanner mode, the image forming device 10 transmits an image scanned by the image scanning unit 109 to the personal computer PC via the network 30.

(2. Setting item) The image forming device 10 can set a processing content of each of the operation modes, i.e., the copy mode, the fax mode, the e-mail mode and the scanner mode, for each setting item.

That is, under the copy mode, the image forming device 10 can make a setting for each of following setting items: "image quality", "density", "paper", "magnification", "sort", "aggregation copy", "repeat", "page division", "duplex copy", "booklet copy", "mixed copy" and "device setting".

Under the fax mode, the image forming device 10 can make a setting for each of following setting items: "image quality", "density", "redial", "broadcast", "off-hook", "speed-dial transmission", "mixed original documents", "fax warp", "fax & copy", "group transmission", "enlarged transmission", "security reception", "transmitter name", "transmitter selection", "transmission notice", "transmission certificate", "time designation", "scan size", "transmitted stamp", "polling", "F-code polling", "F-code transmission", "overseas transmission", "memory transmission", "automatic reception" and "device setting".

Under the e-mail mode, the image forming device 10 can make a setting for each of following setting items: "image quality", "density", "e-mail address", "e-mail retransmission", "e-mail editing", "speed-dial transmission", "mixed original documents", "enlarged transmission", "transmitted stamp", "transmitter name", "transmitter selection", "fax & copy", "time designation", "transmission notice", "fax warp", "divided transmission", "batch scanning", "POP reception", "file format", "transmission certificate", "device setting" and "menu switching".

Under the scanner mode, the image forming device 10 can make a setting for each of following setting items: "image quality", "density", "resolution", "magnification", "folder", "user", "e-mail", "circulation distribution", "bulletin board" and "processing request".

Each of the above-mentioned setting items is an example. Some of the above-mentioned setting items may be omitted, or a different setting item may be added.

Figure 2:
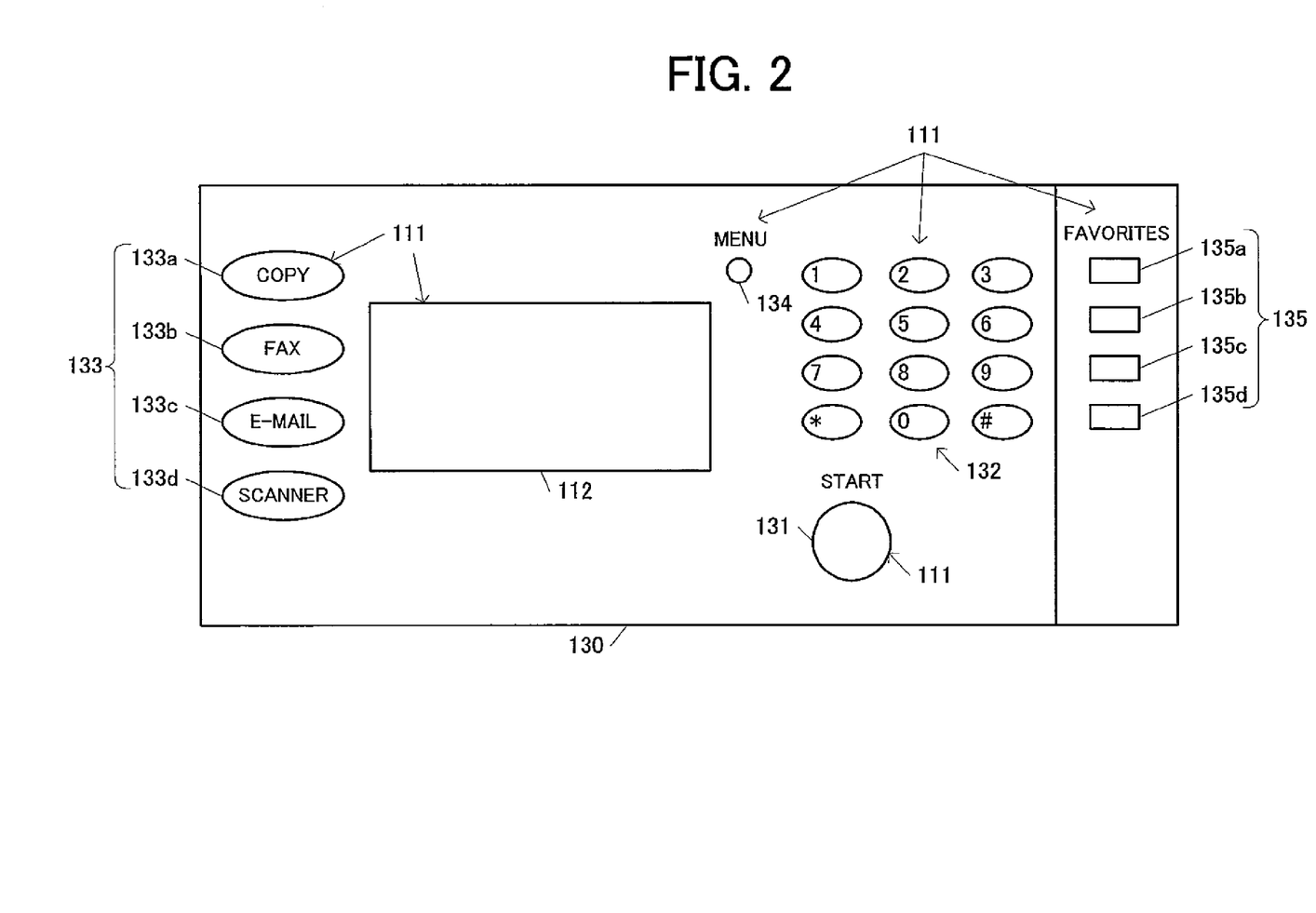
FIG. 2 illustrates a configuration of an operation panel including an operation unit and a display unit.

(3. Configuration of an operation panel) FIG. 2 illustrates a configuration of an operation panel 130 including an operation unit 111 and a display unit 112. The display unit 112 of the image forming device 10 is a touch screen. The display unit 112 also includes a function of the operation unit 111.

That is, in addition to hardware keys (switches), software keys displayed on the display unit 112 may be operated in the image forming device 10.

As illustrated in FIG. 2, as the hardware keys, the operation panel 130 includes a start key 131, a ten-key numeric pad 132, a function switching keys group 133, a menu key 134 and a favorite keys group 135. The start key 131 is operated to instruct the image forming device 10 to start a processing. The ten-key numeric pad 132 is operated to enter numerals or the like to the image forming device 10.

Figure 3:
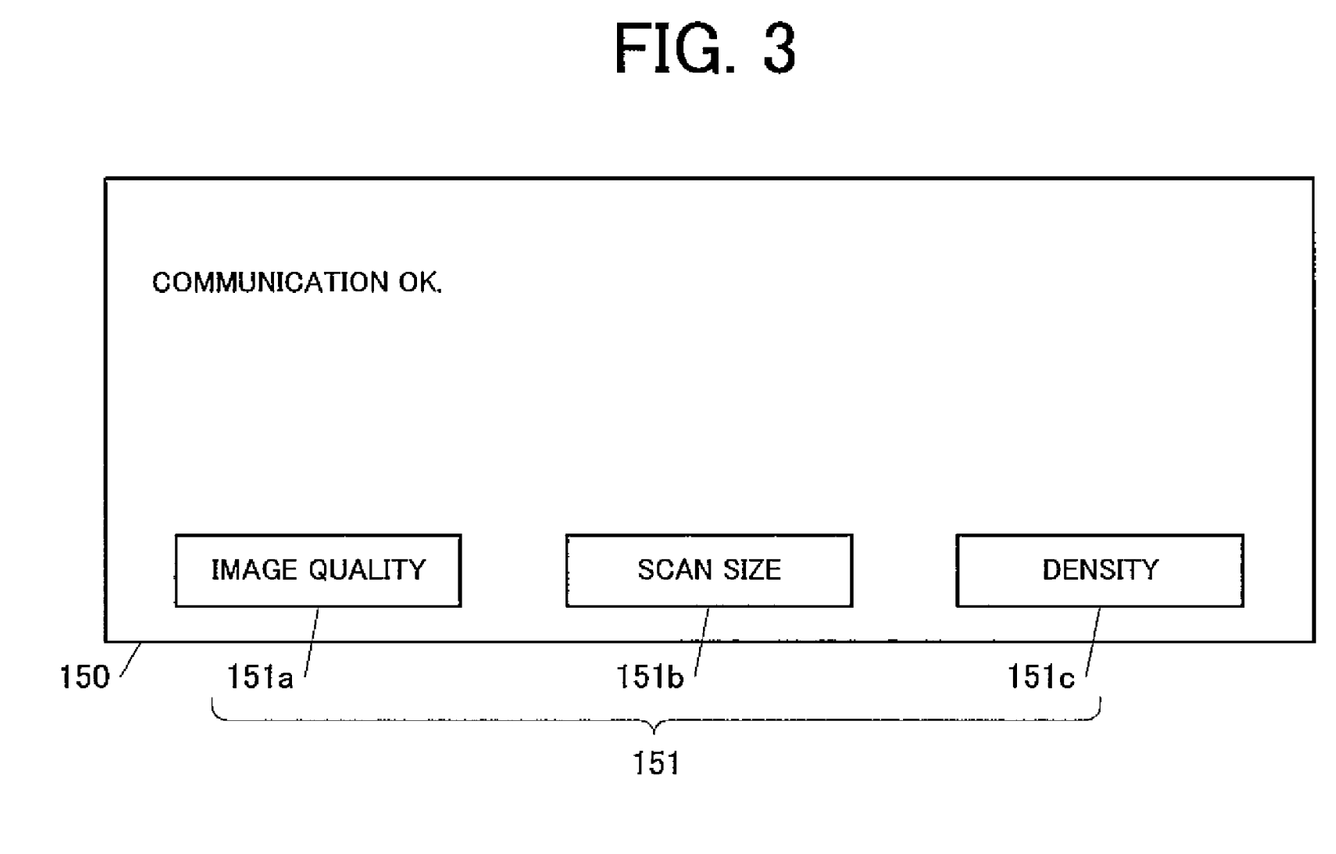
FIG. 3 illustrates a fax standby screen displayed on the display unit.

The function switching keys group 133 includes function switching keys 133a through 133d for switching functions, i.e., the operation modes, of the image forming device 10. When the image forming device 10 detects that either one of the function switching keys 133a through 133d has been operated, the image forming device 10 switches the operation mode to an operation mode corresponding to the operated function switching key. Then, the display unit 112 displays a standby screen of such an operation mode. For example, when the image forming device 10 detects that the function switching key 133b has been operated, the image forming device 10 switches the operation mode to the fax mode. Then, the display unit 112 displays a standby screen of the fax mode (hereinafter also referred to as a "fax standby screen") 150 as illustrated in FIG. 3.

Figure 4:
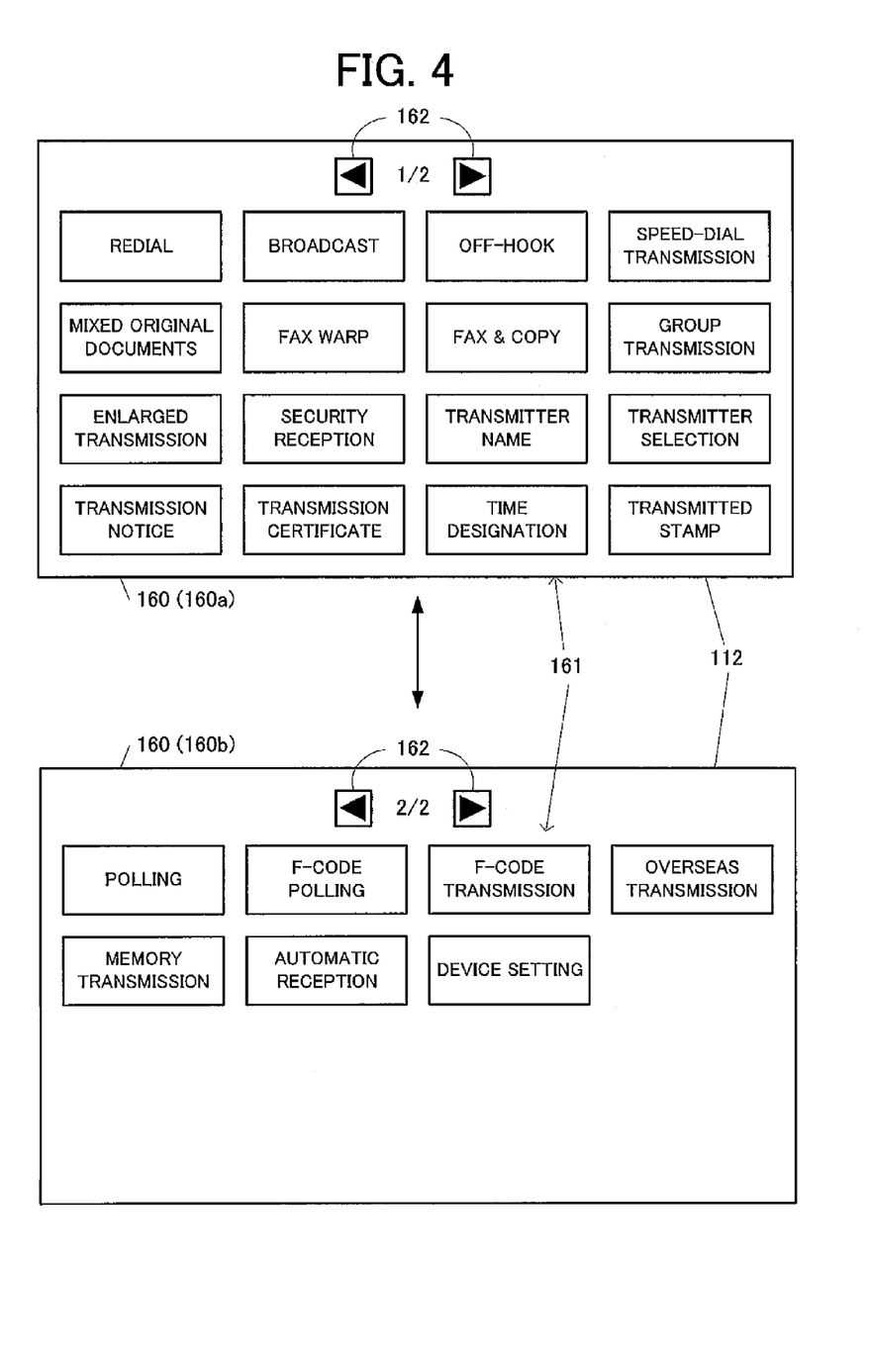
FIG. 4 illustrates a fax menu screen displayed on the display unit.

The menu key 134 is used for invoking a menu screen, which is used for a setting operation of a processing content of the current operation mode, to be displayed on the display unit 112. For example, when the image forming device 10 detects that the menu key 134 has been operated under the fax mode, the display unit 112 displays a menu screen of the fax mode (hereinafter also referred to as a "fax menu screen") 160 as illustrated in FIG. 4. Alternatively, the menu screen may be invoked to the display unit 112 by an operation other than the operation of the menu key 134.

Each of favorite keys 135a through 135d included in the favorite keys group 135 is a shortcut key variably assigned with any setting item of any operation mode selected from all of the setting items of all of the operation modes. The favorite keys 135a through 135d are assigned to facilitate an access to a setting screen of a desired setting item. When the image forming device 10 detects that an operation has been performed on one of the favorite keys 135a through 135d, the display unit 112 displays a setting screen to be used for a setting operation of a setting item assigned to the operated favorite key. Accordingly, the setting operation can be performed for such a setting item.

As described above, by providing the favorite keys group 135 which can be operated regardless of the operation mode, the image forming device 10 can easily perform the setting operation for the setting item assigned to the favorite keys group 135. A limitation is not imposed on the operation mode of the setting item which can be assigned to each of the favorite keys 135a through 135d. Therefore, even when a number of favorite keys included in the favorite keys group 135 is small, a necessary setting item can be assigned in the image forming device 10. In the image forming device 10, only one setting item may be assigned to each of the favorite keys 135a through 135d. Therefore, it is possible to prevent an erroneous operation resulting from a plurality of setting items being assigned to each of the favorite keys 135a through 135d.

Further, FIG. 2 illustrates an example in which the favorite keys group 135 includes four favorite keys. However, the present invention is not limited to this example. A number of favorite keys included in the favorite keys group 135 may be three or less or five or more.

(4. Standby screen) Next, with reference to an example of the fax standby screen 150 illustrated in FIG. 3, a description will be made of a standby screen displayed on the display unit 112 under a standby state of each of the operation modes.

As illustrated in FIG. 3, the fax standby screen 150 includes a fax standby screen keys group 151, which is a software keys group capable of being variably assigned with any setting item selected from all setting items of the fax mode. A setting item, which has already been assigned to the favorite keys group 135, may also be assigned to the fax standby screen keys group 151.

In the same manner as the favorite keys group 135, when the image forming device 10 detects that an operation has been performed on one of fax standby screen keys 151a through 151c included in the fax standby screen keys group 151, the display unit 112 displays a setting screen used for a setting operation of a setting item assigned to the operated fax standby screen key. Accordingly, the setting operation can be performed for the displayed setting item.

The fax standby screen keys group 151 differs from the previously described favorite keys group 135 in that the fax standby screen keys group 151 may be operated only when the operation mode of the image forming device 10 is under the fax mode. In addition, the fax standby screen keys group 151 differs from the previously described favorite keys group 135 in that since the fax standby screen keys group 151 is a software keys group, a number of fax standby screen keys included in the fax standby screen keys group 151 may be increased and decreased. Therefore, although the fax standby screen 150 illustrated in FIG. 3 includes three fax standby screen keys 151a through 151c, a number of the fax standby screen keys displayed on the fax standby screen 150 may be two or less or four or more. Further, when all fax standby screen keys included in the fax standby screen keys group 151 cannot be displayed within a single page of the fax standby screen 150, the fax standby screen keys included in the fax standby screen keys group 151 may be displayed over a plurality of switchable pages.

Further, the setting items assigned to the software keys group included in the standby screen differs for each operation mode. That is, in a standby screen of the copy mode (hereinafter also referred to as a "copy standby screen"), any setting item selected from the setting items of the copy mode is variably assigned to a copy standby screen keys group. In a standby screen of the e-mail mode (hereinafter also referred to as an "e-mail standby screen"), any setting item selected from the setting items of the e-mail mode is variably assigned to an e-mail standby screen keys group. In a standby screen of the scanner mode (hereinafter also referred to as a "scanner standby screen"), any setting item selected from the setting items of the scanner mode is variably assigned to a scanner standby screen keys group.

(5. Menu screen) Next, with reference to an example of the fax menu screen 160 illustrated in FIG. 4, a description will be made of a menu screen displayed on the display unit 112 in response to an operation performed on the menu key 134.

As illustrated in FIG. 4, the fax menu screen 160 includes two pages 160a and 160b which can be switchingly displayed by pressing page switching buttons 162. Further, the fax menu screen 160 may include a single page or three or more pages. The fax menu screen 160 includes a fax menu screen keys group 161, which is a software keys group assigned with the following setting items of the fax mode: "redial", "broadcast", "off-hook", "speed-dial transmission", "mixed original documents", "fax warp", "fax & copy", "group transmission", "enlarged transmission", "security reception", "transmitter name", "transmitter selection", "transmission notice", "transmission certificate", "time designation", "transmitted stamp", "polling", "F-code polling", "F-code transmission", "overseas transmission", "memory transmission", "automatic reception" and "device setting". In the same manner as the favorite keys group 135, when the image forming device 10 detects that one of fax menu screen keys included in the fax menu screen keys group 161 has been operated, the display unit 112 displays a setting screen used for a setting operation of the setting item assigned to the operated fax menu screen key. Accordingly, a setting operation can be performed for such a setting item.

The setting items assigned to the fax menu screen keys group 161 are not assigned to the fax standby screen keys group 151. Therefore, depending on the setting items assigned to the fax standby screen keys group 151, a number of the setting items and the fax menu screen keys assigned to the fax menu screen keys group 161 changes.

Further, the menu screen is prepared for each operation mode, and the setting items assigned to the software keys group included in the menu screen differ for each operation mode. That is, in a menu screen of the copy mode (hereinafter also referred to as a "copy menu screen"), a setting item not assigned to the copy standby screen keys group is assigned to a copy menu screen keys group. In a menu screen of the e-mail mode (hereinafter also referred to as an "e-mail menu screen"), a setting item not assigned to the e-mail standby screen keys group is assigned to an e-mail menu screen keys group. In a menu screen of the scanner mode (hereinafter also referred to as a "scanner menu screen"), a setting item not assigned to the scanner standby screen keys group is assigned to a scanner menu screen keys group.

Figure 5:
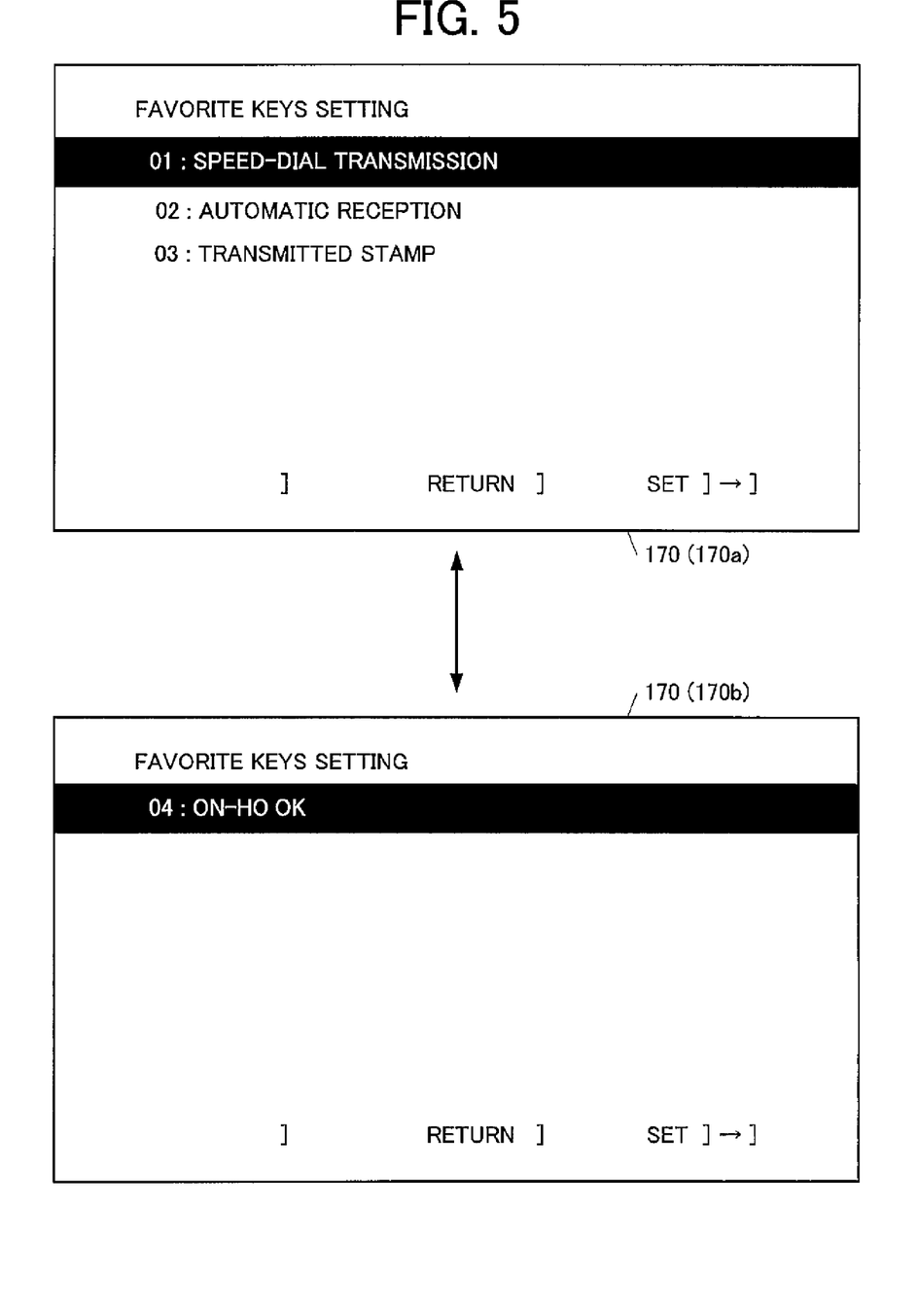
FIG. 5 illustrates a favorite keys setting screen used for editing a setting item assigned to a favorite keys group.

(6. Assigning of setting items) FIG. 5 illustrates a favorite keys setting screen 170 used for editing the setting items assigned to the favorite keys group 135. The favorite keys setting screen 170 is invoked to be displayed on the display unit 112 by a prescribed operation.

As illustrated in FIG. 5, the favorite keys setting screen 170 includes two switchable pages 170a and 170b. The favorite keys setting screen 170 displays the setting items assigned to the favorite keys group 135 (in FIG. 5, "speed-dial transmission", "automatic reception", "transmitted stamp" and "on-hook"). Further, setting items recommended by a manufacturer of the image forming device 10 are assigned to the favorite keys group 135 as default. However, the assigned setting items may be edited by a prescribed operation.

Figure 6:
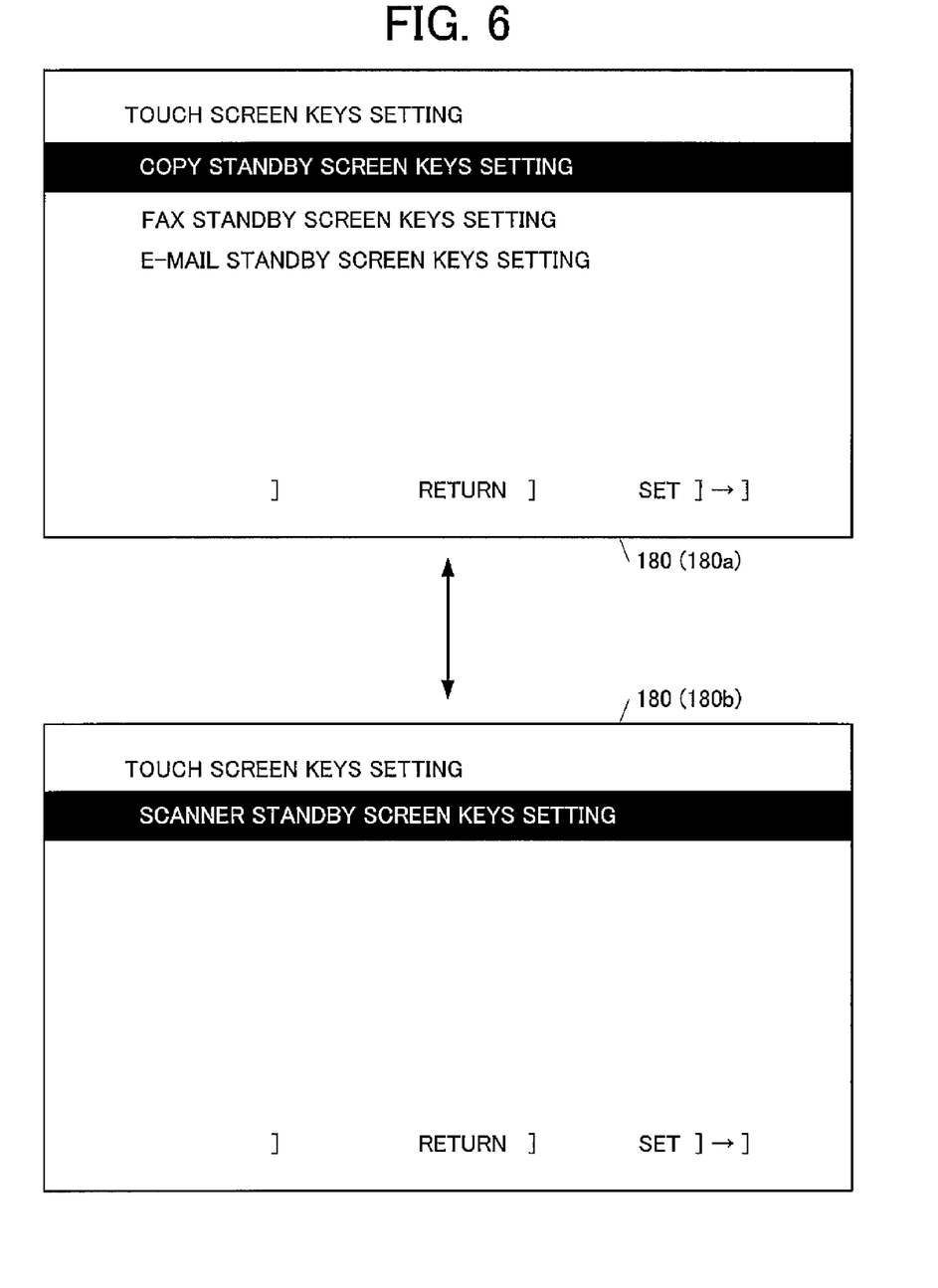
FIG. 6 illustrates an operation mode selection screen for an operator to select a setting item to be edited among setting items assigned to a software keys group included in a standby screen from a copy mode, a fax mode, an e-mail mode and a scanner mode.

FIG. 6 illustrates an operation mode selection screen 180 for an operator to select a setting item to be edited among the setting items assigned to the software keys group included in the standby screen from the copy mode, the fax mode, the e-mail mode and the scanner mode. The operation mode selection screen 180 is invoked to be displayed on the display unit 112 by a prescribed operation. The operation mode selection screen 180 includes two switchable pages 180a and 180b.

Figure 7:
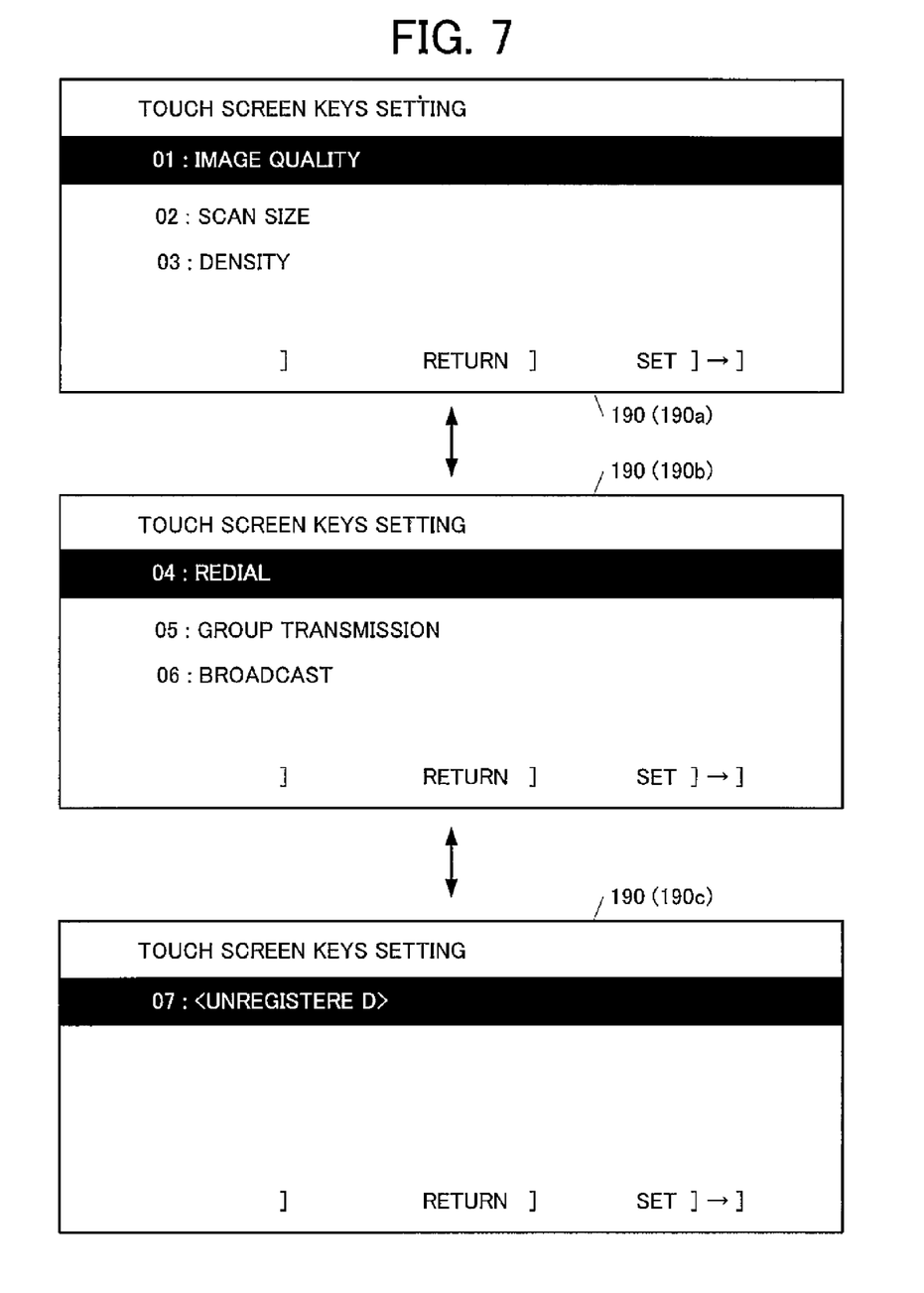
FIG. 7 illustrates an editing screen displayed on the display unit when the fax mode is selected in the operation mode selection screen.

FIG. 7 illustrates an editing screen 190 displayed on the display unit 112 when the fax mode is selected in the operation mode selection screen 180. The editing screen 190 includes three switchable pages 190a, 190b and 190c. The editing screen 190 displays the setting items assigned to the fax standby screen keys group 161 (in FIG. 7, "image quality", "scan size", "density", "redial", "group transmission" and "broadcast") in a manner that the setting items can be edited. A number of the fax standby screen keys included in the fax standby screen keys group 161 can be increased and decreased. Therefore, the already assigned setting item may be deleted from the editing screen 190. In addition, by performing a prescribed operation on a portion displayed as "<unregistered>", a new setting item may be assigned.

According to the present invention, a setting item can be assigned flexibly to each key of the favorite keys group, the software keys group included in the standby screen, and the software keys group included in the menu screen. As a result, operability of the image forming device 10 is improved.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. An image forming device comprising:
    a first operational objects group to which setting items are variably assigned;
    a second operational objects group to which setting items are variably assigned;
    a third operational objects group variably assigned with setting items that are not assigned to the second operational objects group, such that a number of setting items in the third operational objects group changes based on a number of setting items that are assigned to the second operational objects group; and
    a control unit which, when detecting an operation performed on an operational object of one of the first operational objects group, the second operational objects group and the third operational objects group, enables a setting for the setting item assigned to said operational object.

2. The image forming device according to claim 1, wherein any setting item of any operation mode is assigned to each of the operational objects of the first operational objects group.

3. The image forming device according to claim 1, wherein one setting item is assigned to each of the operational objects of the first operational objects group, respectively.

4. The image forming device according to claim 1, wherein the first operational objects group is a hardware keys group.

5. The image forming device according to claim 1, further comprising a display unit arranged to display a software keys group,
    wherein the second operational objects group is the software keys group displayed on the display unit under a standby state of each operation mode.

6. The image forming device according to claim 1, further comprising a display unit arranged to display a software keys group,
    wherein the third operational objects group is the software keys group displayed on the display unit in response to a prescribed operation.

7. An image forming device comprising:
    a first operational objects group operable by an operator;
    a second operational objects group operable by the operator;
    a third operational objects group operable by the operator;
    a first assigning unit arranged for the operator to variably assign any setting item to the first operational objects group;
    a second assigning unit arranged for the operator to variably assign any setting item to the second operational objects group;
    a third assigning unit arranged to variably assign setting items that are not assigned to the second operational objects group to the third operational objects group, such that a number of setting items in the third operational objects group changes based on a number of setting items that are assigned to the second operational objects group; and a control unit which, when detecting an operation performed on each an operational object of one of the first operational objects group, the second operational objects group and the third operational objects group, enables a setting for the setting item assigned to said operational object.

8. The image forming device according to claim 7, wherein the first assigning unit assigns any setting item of any operation mode to each operational object of the first operational objects group.

9. The image forming device according to claim 7, wherein the first assigning unit assigns one setting item to each operational object of the first operational objects group.

10. The image forming device according to claim 7, wherein the first operational objects group is a hardware keys group.

11. The image forming device according to claim 7, further comprising a display unit arranged to display a software keys group,
wherein the second operational objects group is a software keys group displayed on the display unit under a standby state of each operation mode.

12. The image forming device according to claim 7, further comprising a display unit arranged to display a software keys group,
wherein the third operational objects group is a software keys group displayed on the display unit in response to a prescribed operation.

13. A digital multi function peripheral (MFP) comprising:
a hardware keys group to which any setting item may be variably assigned;
a first software keys group to which any setting item may be variably assigned;
a second software keys group to which any setting item not assigned to the first software keys group may be variably assigned, such that a number of setting items in the first software keys group changes based on a number of setting items that are assigned to the second software keys group; and
a control unit that detects an operation of a key in one of the hardware keys group, first software keys group and second software keys group, and enables a setting for the setting item assigned to the operated key.

14. The digital MFP according to claim 13, comprising at least four modes including a copy mode, a fax mode, an email mode and a scanner mode.

15. The digital MFP according to claim 14, wherein each key within the hardware keys group may be assigned with any setting item of any of the four operation modes.

16. The digital MFP according to claim 15, wherein a first software keys group is associated with each of the four operation modes, and wherein each key within a respective first software keys group may be assigned only with setting items from its associated operation mode.

17. The digital MFP according to claim 16, wherein each respective first software keys group is displayed as touch buttons on a standby screen for its associated operation mode.

18. The digital MFP according to claim 16, wherein a second software keys group is associated with each of the four operation modes, and wherein keys within a respective second software keys groups are assigned with those setting items from its associated operation mode that were not assigned to an associated first software keys group.

19. The digital MFP according to claim 18, wherein each respective second software keys group is displayed as touch buttons on a menu screen for its associated operation mode.

20. The digital MFP according to claim 13, wherein at least one key from the first and second software keys group can be assigned with a new setting item.

* * * * *